United States Patent
Lecoq et al.

(10) Patent No.: US 8,254,032 B2
(45) Date of Patent: Aug. 28, 2012

(54) TEST OBJECT USED FOR PROJECTING A SET OF MARKS TO INFINITY

(75) Inventors: Pierre Lecoq, Craville (FR); Vincent Petit, Paris (FR); Franck Delsol, Arpajon (FR)

(73) Assignee: Eads Test & Services, Elancourt (FR)

( * ) Notice: Subject to any disclaimer, the term of this patent is extended or adjusted under 35 U.S.C. 154(b) by 0 days.

(21) Appl. No.: 12/333,570

(22) Filed: Dec. 12, 2008

(65) Prior Publication Data

US 2009/0153862 A1 Jun. 18, 2009

(30) Foreign Application Priority Data

Dec. 12, 2007 (FR) ...................... 07 08651

(51) Int. Cl.
*G02B 27/30* (2006.01)
(52) U.S. Cl. ........................ 359/641; 359/245
(58) Field of Classification Search .................. 359/641
See application file for complete search history.

(56) References Cited

U.S. PATENT DOCUMENTS

| | | | | |
|---|---|---|---|---|
| 2,450,712 A | | 10/1948 | Brown | |
| 3,712,739 A | * | 1/1973 | Hock | 356/369 |
| 4,101,188 A | * | 7/1978 | Yevick | 385/119 |
| 4,695,892 A | * | 9/1987 | Mary | 348/176 |
| 5,157,427 A | * | 10/1992 | Humphrey | 351/205 |
| 7,031,579 B2 | * | 4/2006 | Sisodia et al. | 385/120 |
| 2008/0151266 A1 | * | 6/2008 | Morikuni et al. | 356/618 |
| 2008/0278570 A1 | * | 11/2008 | Gharib et al. | 348/46 |

FOREIGN PATENT DOCUMENTS

| | | |
|---|---|---|
| CH | 113578 A | 2/1926 |
| EP | 0539264 A | 4/1993 |

* cited by examiner

*Primary Examiner* — James Jones
(74) *Attorney, Agent, or Firm* — Browdy and Neimark, PLLC

(57) ABSTRACT

The collimated test object according to the invention is used for projecting to infinity a set of marks, the positions of which are very accurately known so as to be able to verify the alignment and/or the distortion of optical equipment such as sensors or collimated screens. This test object comprises a plurality of microcollimated sets, each comprising a light source, an elementary test object comprising a mark illuminated by the source as well as a collimation lens for projecting the mark to infinity. With this solution, one gets free of aberration problems to which are subject convention test objects of large dimensions.

12 Claims, 2 Drawing Sheets

TEST OBJECT USED FOR PROJECTING A SET OF MARKS TO INFINITY

BACKGROUND OF THE INVENTION

1. Field of the Invention

The present invention relates to a test object used for projecting to infinity a set of marks which may for example form a grid of points, of crosses or other patterns and the positions of which are very accurately known in order to verify alignment and/or distortion of optical equipment such as for example sensors, collimated screens.

2. Description of the Prior Art

Traditionally, a collimated test object is made from a plate comprising the set of desired marks and a device for projecting to infinity these marks, comprising a combination of lenses.

This combination of lenses, often very complex, is designed so as to achieve not only collimation but also correction of chromatic and geometrical aberrations which are all the more apparent since the dimensions of the test object located behind the lenses are large.

Generally, this combination of lenses is specifically designed for each particular purpose and has a very high manufacturing cost.

OBJECT OF THE INVENTION

The object of the invention is therefore more particularly to suppress these drawbacks.

SUMMARY OF THE INVENTION

For this purpose, instead of using a test object comprising a plurality of light marks and a collimation device common to all the marks of this test object and which consequently comprises a complex and costly combination of lenses for suppressing aberrations, it proposes a test object comprising a plurality of microcollimated sets each comprising a light source, an elementary test object comprising a mark illuminated by said source as well as collimation means for projecting said mark to infinity.

Considering the fact that in each of the microcollimated sets, the mark which has very small dimensions is centered on the optical axis of the collimation means, the aberration problems mentioned earlier are disposed of and it becomes possible to use collimation means consisting in a simple collimation lens, easy to mount and therefore not very costly.

Thus, unlike the prejudices of one skilled in the art who would naturally tend to use a single optical assembly for reducing costs, this solution proves to be less costly and further provides larger flexibility in use.

Moreover, the axes of the collimated assemblies may be oriented depending on the field required for forming the overall collimated image of the test object. This orientation may be obtained statically, for example by machining the support of the test object or dynamically by for example using micromechanisms, magnetic or electromagnetic, acousto-optical systems, etc . . .

BRIEF DSCRIPTION OF THE DRAWINGS

Embodiments of the invention will be described hereafter, as non-limiting examples, with reference to the appended drawings wherein.

DESCRIPTION OF THE PREFERRED EMBODIMENTS

Figure 1:
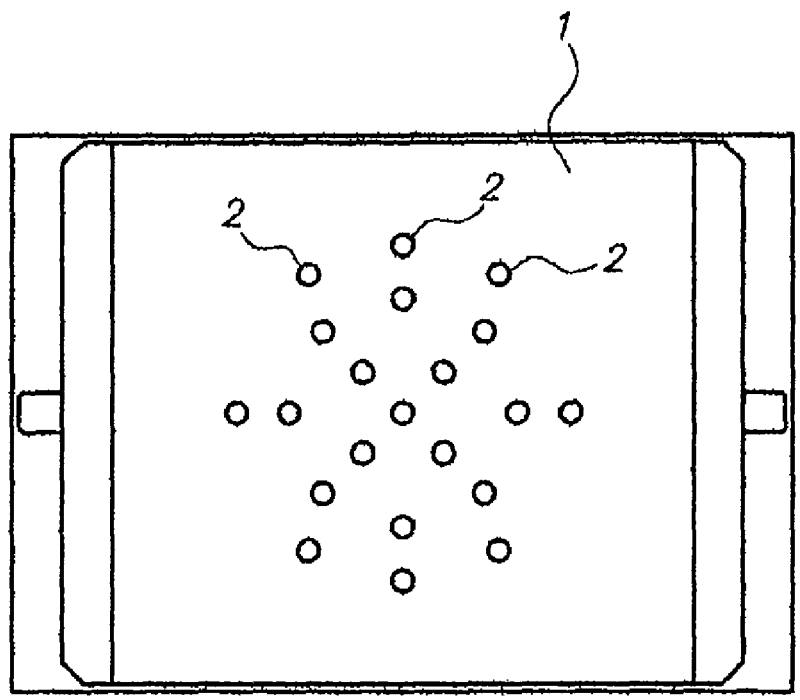
FIG. 1 is a front view of a test object according to the invention comprising a plurality of microcollimated sets.
Figure 2:
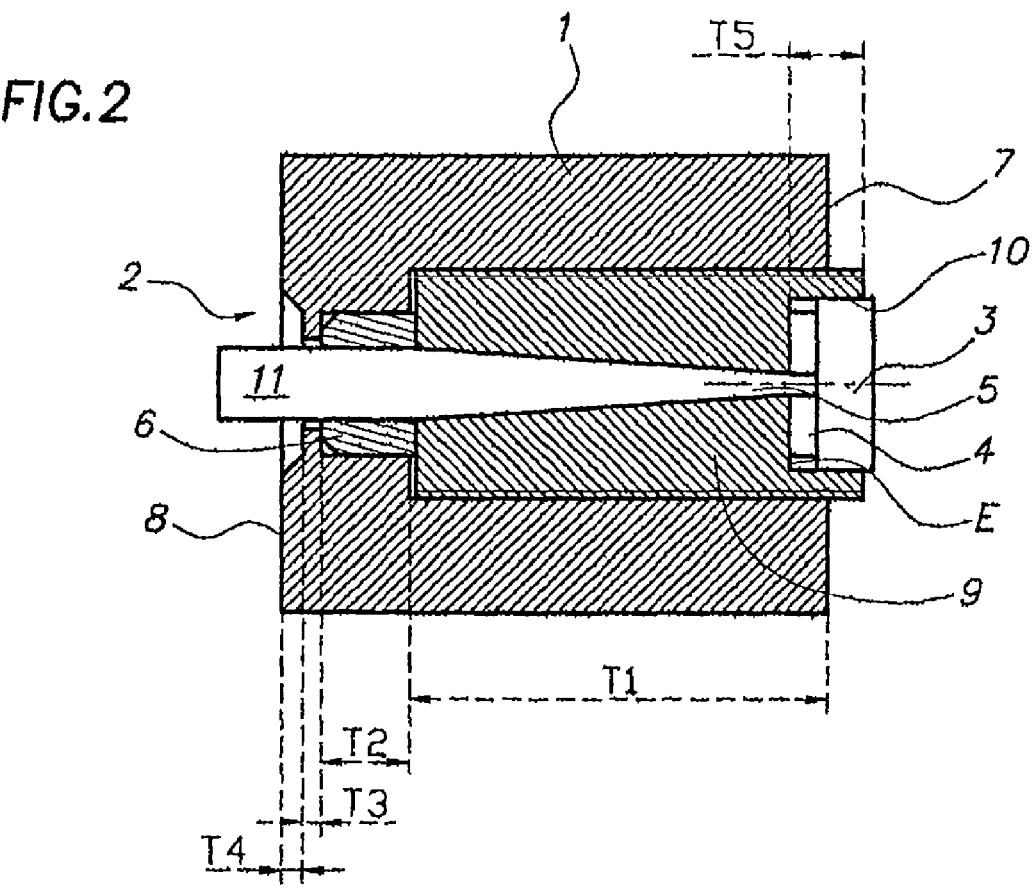
FIG. 2 is a sectional view of a microcollimated set used in the test object illustrated in FIG. 1.
Figure 4:
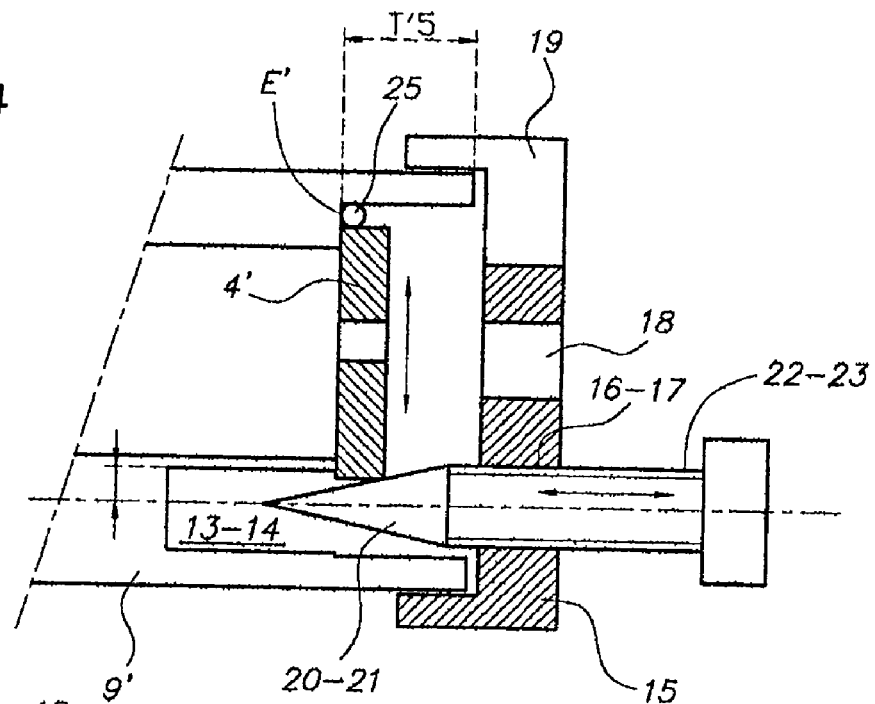
FIGS. 3 and 4 show an alternative embodiment of a microcollimated set equipped with a device for adjusting the elementary test object, FIG. 3 being a schematic perspective view, FIG. 4 being a partial axial sectional view.
Figure 3:
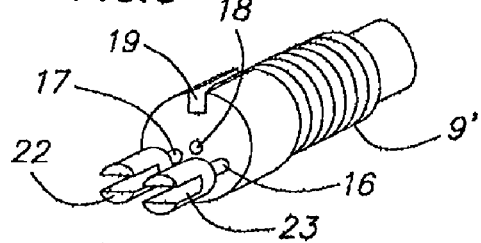

In the example illustrated in FIGS. 1 and 2, the test object according to the invention consists of a supporting plate 1 provided with a plurality of through-perforations 2 of a small diameter (a few millimetres) in each of which a collimated assembly is positioned, comprising a light source 3, an elementary test object 4 forming a light mark 5 illuminated by the source 3 and a collimation lens 6 for projecting said mark 5 to infinity.

In this example, the perforations 2 and, consequently, the microcollimated marks are positioned so as to form a <<radiating>> pattern from a central mark. The position of these marks is determined and known accurately.

The perforations 2 of the supporting plate housing the collimated assemblies each have a cylindrical shape stepped with several bore levels comprising:

a first tapped cylindrical section $T_1$ which extends from the rear face 7 of the plate 1 and has a length here substantially equal to three quarters of the thickness of the plate 1, a second section $T_2$ with smooth cylindrical surface which has a diameter less than that of the first section $T_1$, a third section $T_3$ of a small length, with a diameter less than that of the second section $T_2$: this third section $T_3$ appears as an annular ring, forming a bore shrinkage, a fourth section $T_4$ of a frustro-conical shape, flaring right up to the front face 8 of the plate 1.

The collimation lens 6 of a partly cylindrical shape, with a diameter substantially equal to that of the second section $T_2$ and with a lens slightly longer than the latter, is positioned inside the perforation 2.

This lens 6 is engaged into the second section $T_2$ so as to come axially into abutment onto the bore shoulder of the third section $T_3$.

Maintaining the lens 6 in position in the second section $T_2$ is ensured by means of a cylindrical bushing 9 with an outer threaded surface which will screw into the tapped thread of the first section $T_1$ until it bears upon the lens 6 in order to maintain it applied against the shoulder of the section $T_3$.

The cylindrical inner surface of the bushing on the side opposite to its supporting surface on the lens, has a bore stepping 10 forming a cylindrical bore section $T_5$ with a larger diameter, in which the elementary test object 4 illuminated by the light source 3 is positioned. The elementary test object 4 consists in a flat disk provided at its centre with a perforation forming the light mark 5.

In this example, the light source 4 has been schematically illustrated by a block, it being understood that the invention is not limited to a particular light source.

The elementary test object 4 is centered here on the optical axis of the lens 6 and its front face is placed in the object focal plane of said lens 6.

Consequently at the output of the lens 6, a parallel light beam is obtained. The image of the light mark 5 is projected to infinity.

By means of these arrangements, the test object according to the invention behaves in a similar way to conventional test objects using an optical assembly common to the light marks of the test object. However, the beams emitted by the microcollimated sets are not subject to aberration phenomena as this is the case in conventional test objects.

The field required for forming the collimated global image produced by the test object illustrated in FIG. 1 is obtained by tilting by a predetermined angle, the optical axis of the microcollimated assemblies. This tilt may be obtained statically during machining of the perforations 2 or dynamically by using micromechanical, magnetic or other assemblies for example.

FIGS. 3-8 illustrate the principle of a centering and/or play compensating device of the elementary test object 4 in a spacer bushing 9' of the type of bushing 9 illustrated in FIG. 2.

In this example, the spacer bushing 9' is provided on the side of the elementary test object 4' with two axial perforations positioned at about 45° from each other, which open into the cylindrical bore section $T'_5$.

Moreover, on this same side, the spacer bushing 9' may be closed by adjustment tooling comprising a lid-shaped body 15 which will be screwed onto the end of the spacer bushing 9'. This body 15 comprises two tapped perforations 16, 17, respectively located in the axis of the axial perforations 13, 14, a central perforation 18 intended to receive (or to be illuminated by) a light source and an axial cavity 19 formed in the border of the lid opposite to both tapped perforations 16, 17.

As earlier, the elementary test object 4' has a diameter less than the diameter of the bore section $T'_5$ of the bushing 9' and is positioned axially in abutment against the bore shoulder E'.

It is retained vertically on two supporting cones 20, 21 which extend, two adjustment screws 22, 23 coaxially which will respectively be screwed into the tapped perforations 16, 17.

By means of these arrangements, the displacement of the elementary test object 4' in a radial plane of the spacer bushing 9' is obtained by a wedge effect by turning the screws 22, 23 so as to generate axial displacements of the conical ends of said screws 22, 23.

Control of the position of the optical axis of each microcollimator (materialized by the position of the elementary test object 4') is carried out by means of a theodolite, the illumination of the microtest object 4' being then ensured by means of the light source associated with the adjustment tooling.

When the elementary test object 4' is placed properly, a point of adhesive 25 is injected through the axial cavity 19.

FIGS. 5-8 show different positions of the microtest object versus the screwing level of the screws.

Figure 5:
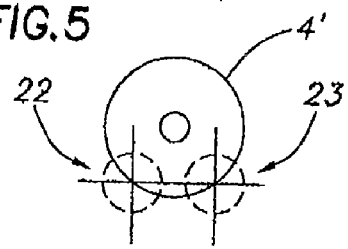
FIGS. 5-8 are schematic illustrations of the extreme positions of an elementary test object.
Figure 6:
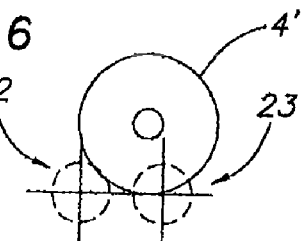
Figure 7:
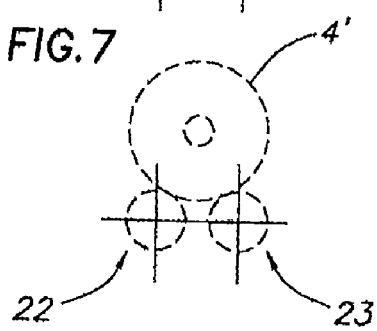
Figure 8:
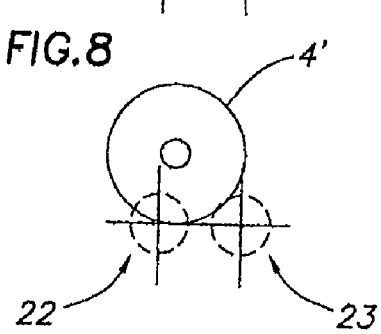

Thus, FIG. 5 corresponds to a position in which the screws 22, 23 are in the unscrewed condition. In FIG. 6, the screw 22 is in the screwed condition, whereas the screw 23 is in the unscrewed condition. FIG. 7 corresponds to a position in which both screws 22, 23 are in the screwed condition. In FIG. 8, the screw 23 is in the screwed condition whereas the screw 22 is in the unscrewed condition.

As indicated earlier, the solution proposed by the present invention has many advantages. In particular:

The overall size of the microcollimated test object is not limited. The overall size may range well beyond what may be contemplated with a lens combination.

The shape of the collimator is not limited. The making of concave or convex collimators may be contemplated for encompassing detectors with very large fields (example: a projection dome for large field cameras).

The dynamics of marks. It is possible to independently control each mark and thereby produce a dynamic collimated test object.

Easy production of a visible, infrared, near infrared or combined collimated test object.

The manufacturing cost is much less than for a collimator with a lens combination.

The invention claimed is:

1. A collimated test object used for projecting a set of marks to infinity, comprising:
   a plurality of independent microcollimated sets, and
   a supporting plate supporting the plurality of microcollimated sets,
   wherein each microcollimated set comprises:
   a separate light source, a separate elementary test object comprising a mark illuminated by said source, and
   a separate collimation means for projecting said mark to infinity,
   wherein the supporting plate comprises a plurality of through-perforations, and
   wherein each collimation means is positioned in a respective through-perforation.

2. The test object according to claim 1, wherein that the collimation means consist in a collimation lens.

3. The test object according to claim 1, wherein the axes of the collimated sets are oriented depending on the field required for forming the overall collimated image of the test object.

4. The test object according to claim 3, wherein the orientation of the collimated sets is obtained by machining of the support of the test object.

5. The test object according to claim 3, where-in the orientation of the microcollimated sets is ensured by means of micromechanisms, magnetic, electromagnetic or even acousto-optical systems.

6. The test object according to claim 1, wherein the collimation means consist of a collimation lens, and
   wherein each through-perforation comprises:
   a first tapped cylindrical section which extends from the rear face of the plate,
   a second section with a smooth cylindrical surface of a diameter less than that of the first section,
   a third section with a diameter less than that of the second section,
   wherein the lens is positioned in the second section so that it will abut on a bore shoulder of the third section, and
   a threaded bushing which will be screwed into the internal thread of the first section in order to maintain the lens applied on said shoulder,
   wherein said bushing has a bore stepping forming a bore section of larger diameter.

7. The test object according to claim 6, comprising a centering or play compensating device of the elementary test object, this device comprising a body borne by the aforesaid threaded bushing and provided with two tapped perforations into which two screws terminated by two conical portions supporting said elementary test object will be screwed.

8. The test object according to claim 7, wherein said centering and compensating device comprises a light source.

9. The test object according to claim 7, wherein said body has the shape of a lid closing said spacer bushing.

10. The test object according to claim 9, wherein said body comprises an axial cavity through which a point of adhesive may be injected in order to ensure attachment of a elementary test object.

11. The test object according to claim 7, wherein said threaded bushing comprises two axial perforations into which the conical ends of said screws will engage respectively.

12. The test object according to claim 3, wherein each mark is independently controlled to produce a dynamic collimated test objection.

* * * * *